Feb. 17, 1925.
J. S. SHANDS
1,526,611
COMBINATION LOCK AND TIRE HOLDER
Filed Dec. 22, 1922
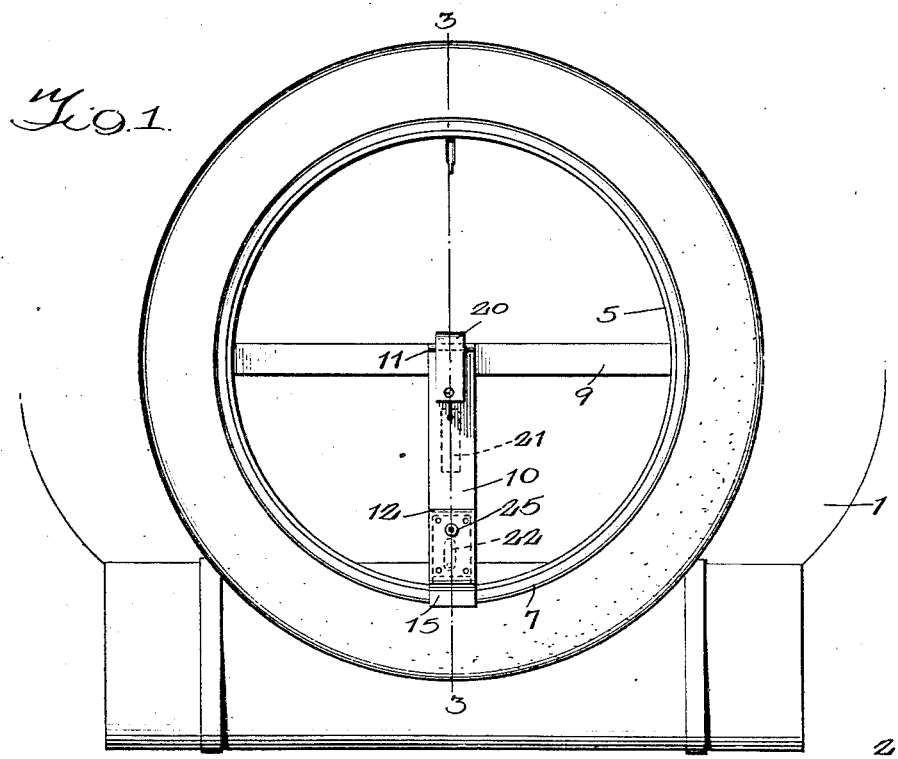
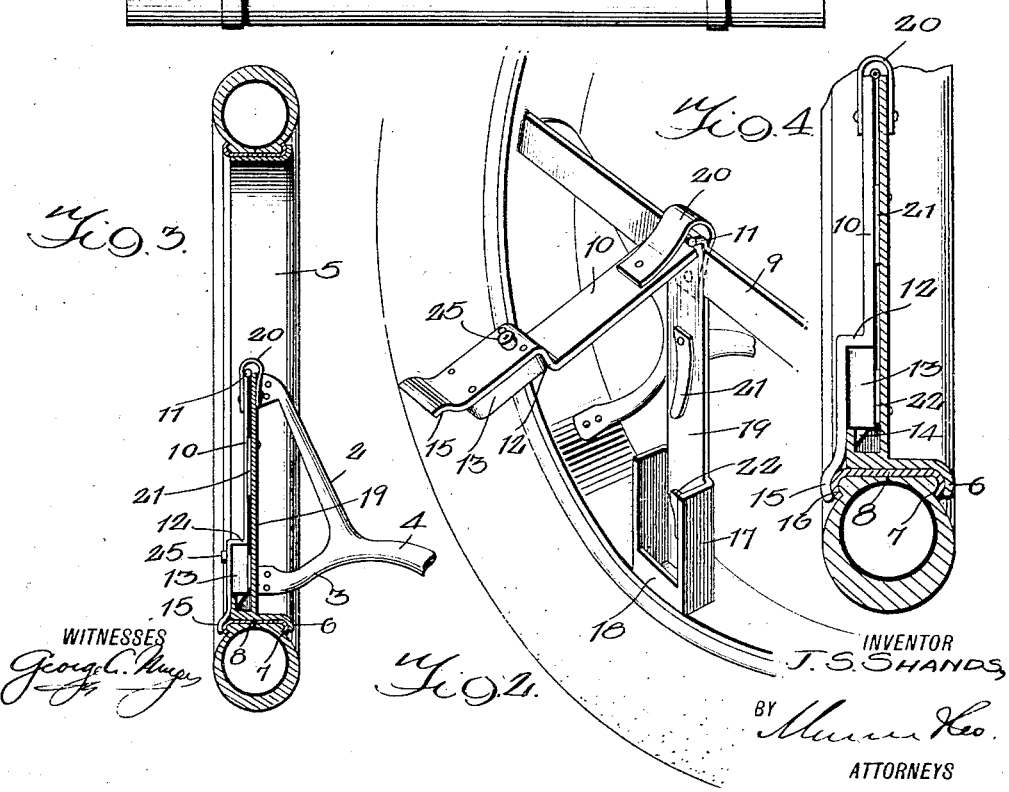
INVENTOR
J. S. Shands
ATTORNEYS Patented Feb. 17, 1925.

1,526,611

UNITED STATES PATENT OFFICE.

JAMES STAFFORD SHANDS, OF GAINESVILLE, FLORIDA.

COMBINATION LOCK AND TIRE HOLDER.

Application filed December 22, 1922. Serial No. 608,519.

*To all whom it may concern:*

Be it known that I, JAMES STAFFORD SHANDS, a citizen of the United States, and a resident of Gainesville, in the county of Alachua and State of Florida, have invented certain new and useful Improvements in Combination Locks and Tire Holders; of which the following is a specification.

This invention relates to a spare tire carrier and has for its object the provision of a tire rack having means for simultaneously securing and locking a spare tire to the rack.

Another object of the invention is the provision of a tire rack which is simple of construction and efficient in operation for supporting a spare tire in some convenient position on an automobile and for preventing unauthorized removal of the tire from the rack.

Other objects and advantages of the invention will be apparent during the course of the following description.

In the accompanying drawings, forming a part of this specification, and in which like reference numerals designate like parts throughout the same—

Figure 1 shows a front elevation of the tire rack on the rear of an automobile.

Figure 2 is a fragmentary view in perspective of the tire rack in open position.

Figure 3 is a transverse vertical section taken along the lines 3—3 of Figure 1.

Figure 4 is an enlarged vertical section of the rack in closed position.

Referring to the drawings, 1 designates the rear of an automobile to which is adapted to be secured my improved tire rack by means of the rearwardly extending bracket arms 2 and 3 connected at their inner end by a bar 4 which is adapted to be secured in any approved manner to some part of the rear end of the automobile. The forward ends of the bracket arms 2 and 3 are connected in spaced relation to an annular ring 5.

As shown more particularly in Figure 4, the rim is provided at its rear peripheral edge with an outwardly curved flange 6 adapted to receive a flange 7 of the demountable rim 8. The inner surface of the demountable rim is adapted to seat upon the outer periphery of the annular ring 5.

Extending transversely between opposite points on the ring 5 and secured thereto is a flat rod 9. Said rod is located substantially at the horizontal diameter of the ring 5.

A depending locking leaf 10 is hingedly connected at 11 centrally of and on the rod 9. The intermediate portion of the leaf 10 is curved outwardly and offset from the plane of said leaf at 12 in order to form a seat for a lock 13, the inner surface of which is flush with the rear face of the main body of the leaf 10. The lock 13 has the usual lock bolt 14 projecting downwardly from the lock and spaced from the lower end of said leaf.

The extreme lower end of the leaf is curved outwardly as at 15 to conform to the curvature of the outer flange 16 of the rim 8 and is adapted to snugly embrace said flange.

Secured rigidly to the inner face of the bottom of the ring 5 is a lock casing 17 in the shape of a parallelopiped having an open front face with a keeper 18 extending across the lower end of the opening which is adapted to be engaged by the lock bolt 14. Formed integrally with the upper end of the casing 17 and extending radially upward is a bar 19 having its upper end formed integrally or otherwise connected to the bar 9.

A leaf spring 20 has one end secured to the rod 9 while its other end is secured to the leaf 10 in such a manner that when the lock bolt 14 has been released from the keeper 19 the spring will urge the leaf outwardly and away from the ring 5.

A spring 21 secured to the front face of the radial bar 19 is adapted to engage the swinging leaf 10 when the lock bolt is engaged by the keeper 18 to prevent rattling of the leaf.

A spring 22 secured to the rear wall of the casing 17 engages the rear face of the lock 13 to prevent rattling and wear of said lock when disposed within the casing 17.

A key slot 25 is cut through the leaf 10 and in alinement with the usual slot or opening in the lock 13 for the insertion of a key for releasing said lock bolt from its position with the keeper 18 when it is desired to remove the tire from the rack.

What I claim is:

1. A tire rack comprising a circular ring adapted to be secured to a fixed part of an automobile, having one peripheral edge flanged, a rod secured within the ring at substantially the horizontal diameter of said ring, a lock casing having an open face mounted rigidly and radially on the inner surface of said ring and having a flat radial extension integrally connected to the rod, a keeper formed adjacent the bottom of the casing and extending across a portion of the opening of said casing, a leaf pivotally mounted on the rod adapted to aline with the flat extension of the casing and provided with an offset portion forming a closure for the casing, a lock secured to the rear face of the offset portion of the leaf and having a lock bolt adapted to engage the keeper when said lock is located within the lock casing on the ring, the lower end of the leaf being offset and adapted to engage the outer peripheral flange of a demountable rim adapted to be mounted on the ring, a leaf spring secured at one end to the horizontal rod and at its other end to the leaf for urging the leaf outwardly from the radial extension on the casing, a spring secured to the radial extension engageable with the leaf to prevent rattling of the leaf, and a spring within the casing engageable with the lock to prevent movement of the lock when located within the casing.

2. A tire rack comprising a ring adapted to be rigidly secured to a fixed part of an automobile, a horizontal rod extending transversely with its opposite ends secured to the inner surface of said ring, a keeper formed upon the inner surface of the ring, and a bar extending radially downward from the rod and connected with the keeper, said keeper being offset from the plane of the bar, a leaf hingedly connected with the horizontal rod and provided with a lock offset from the plane of the leaf, said lock having a lock bolt adapted to engage the keeper, the free end of the leaf adapted to project beyond the forward peripheral edge of the ring for maintaining a demountable rim in position on the ring.

3. A tire rack comprising a ring adapted to be rigidly secured to a fixed part of an automobile, a rod rigidly connected with the ring, a leaf hingedly connected to the rod and depending downwardly from said rod, a lock mounted on the leaf, a casing rigidly secured to the ring for enclosing the lock and provided with a keeper engaging the usual lock bolt of the lock, the lower end of the leaf being adapted to project beyond the periphery of the ring, and engage one peripheral flange of a rim, a flange on the rear peripheral edge of the ring adapted to embrace the other flange of the rim, and spring means for automatically forcing the leaf and lock away from the ring and keeper.

4. A tire rack adapted to be rigidly connected to a fixed part of an automobile, comprising an annular means for receiving a demountable rim, a rod connected to the rim supporting means, a leaf hingedly connected to the rod and swingable in a plane which is at right angles to the plane of said rod and adapted to engage one of the flanges of the rim while the supporting means is provided with means for embracing the other flange of the rim, and a lug on the swingable leaf adapted to engage the supporting means for locking the swingable leaf in position for preventing unauthorized removal of the rim.

5. A tire rack comprising a ring adapted to be rigidly secured to a fixed part of an automobile, a horizontal rod extending transversely with its opposite ends secured to the inner surface of said ring, a keeper formed upon the inner surface of the ring, and a bar extending radially downward from the rod and connected with the keeper, said keeper being offset from the plane of the bar, a leaf hingedly connected with the horizontal rod and provided with a lock offset from the plane of the leaf, said lock having a lock bolt adapted to engage the keeper, the free end of the leaf adapted to project beyond the forward peripheral edge of the ring for maintaining a demountable rim in position on the ring, spring means embracing the hinged connection between the rod and the leaf for maintaining the leaf extended outwardly from the radial bar, and means on the bar and engageable with the leaf to prevent rattling of said leaf.

JAMES STAFFORD SHANDS.